United States Patent [19]

Widmer

[11] 4,313,031
[45] Jan. 26, 1982

[54] ENCIPHER-DECIPHER DEVICE HAVING SEMI-AUTOMATIC GENERATION OF THE CODE KEY DURING DATA ENTRY

[75] Inventor: Walter R. Widmer, Niederhasli, Switzerland

[73] Assignee: Gretag Aktiengesellschaft, Regensdorf, Switzerland

[21] Appl. No.: 87,633

[22] Filed: Oct. 23, 1979

[30] Foreign Application Priority Data

Oct. 27, 1978 [CH] Switzerland .................. 11121/78

[51] Int. Cl.³ .............................................. H04L 9/00
[52] U.S. Cl. ............................. 178/22.17; 178/22.12; 178/22.18
[58] Field of Search ............. 178/22; 364/717; 375/2
[56] References Cited

U.S. PATENT DOCUMENTS

| | | | |
|---|---|---|---|
| 3,790,768 | 2/1974 | Chevalier et al. | 364/717 |
| 4,133,974 | 1/1979 | Morgan | 178/22 |
| 4,151,404 | 4/1979 | Harrington et al. | 364/717 |
| 4,166,922 | 9/1979 | Kinch, Jr. et al. | 178/22 |
| 4,172,213 | 10/1979 | Barnes et al. | 178/22 |
| 4,182,933 | 1/1980 | Rosenblum | 178/22 |
| 4,229,817 | 10/1980 | Morgan et al. | 375/2 |

*Primary Examiner*—Howard A. Birmiel
*Attorney, Agent, or Firm*—Burns, Doane, Swecker & Mathis

[57] ABSTRACT

An encipher-decipher apparatus including an input keyboard and a processing and control stage which enciphers or deciphers data received directly from the keyboard or preferably from a text store with the aid of a cipher generator. The cipher generator produces a cipher sequence dependent on two code data items that determine the initial state of the cipher generator. One item for encryption is supplied as a set of random code characters from a random generator. The random generator comprises a continually cycled modulo-n counter and a FIFO memory into which the instantaneous state of the counter is entered at each of successive actuations of keys of the keyboard, such key operations being those done in any event in the use of the apparatus. The cycle time of the counter is much less than the time between consecutive key operations. A clock rate of 100 kHz is suggested. The set of characters is read out of the FIFO store at the start of data processing for use by the cipher generator.

14 Claims, 1 Drawing Figure

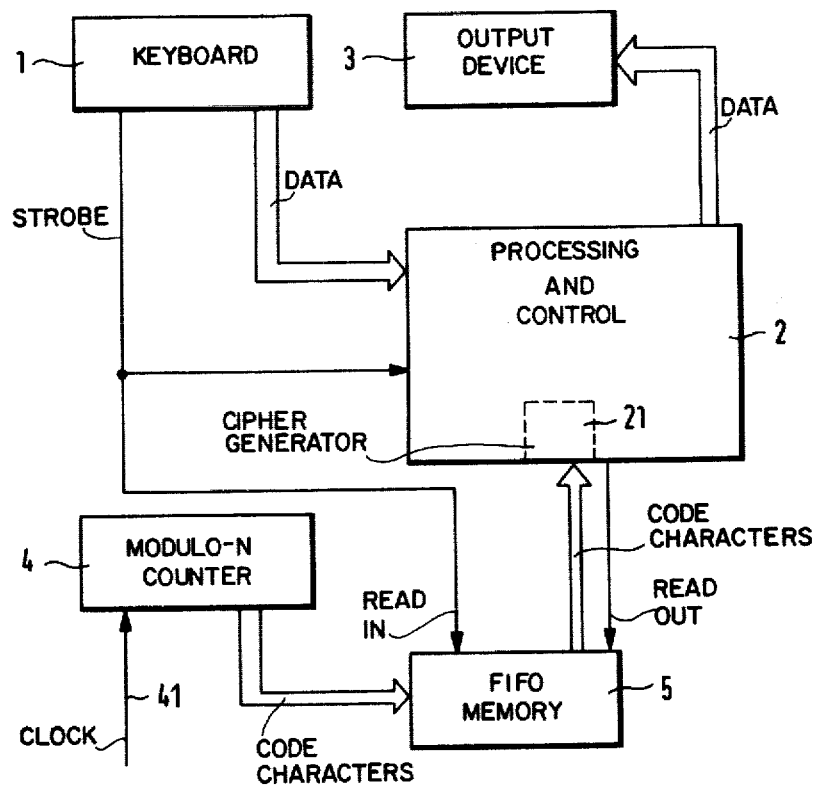

ENCIPHER-DECIPHER DEVICE HAVING SEMI-AUTOMATIC GENERATION OF THE CODE KEY DURING DATA ENTRY

FIELD OF THE INVENTION

This invention relates to apparatus for data encryption comprising an input keyboard, an enciphering stage for processing data which includes a cipher generator that produces a cipher pulse sequence dependent on a code item supplied thereto in the form of a set of code characters, and a random code generator coupled to said cipher generator for generating said code item.

The invention has particular application to an apparatus for encryption-decryption data in which the data is processed in an encipher-decipher stage and in which the cipher generator produces the cipher pulse sequence in dependence upon its initial state at the start of data processing, the initial state being determined by two code items, the random code generator, or an equivalent, providing one of the code items. Such apparatus may further include means for controlling the sequence of functions of the apparatus and an output device such as a display.

THE PRIOR ART

Apparatus of the kind set forth in the preceding paragraph is commercially available, for example the apparatus manufactured by Gretag A.G. in Switzerland under the model nos. TC803, GC905 and GC805. Various features of this apparatus are disclosed in U.S. Pat. Nos. 3,291,208, 3,657,477, 3,678,198, 3,740,475, 4,145,568 (all to Ehrat) and 4,068,089 (Kuhnlein et al). Features of similar apparatus are also disclosed in Swiss Pat. Nos. 592,397 and 549,261.

In such apparatus the one code data item is either written-in manually via the keyboard in separate operation character by character; or with the aid of the random code generator the operation is performed automatically, which entails relatively expensive additional circuitry. With the advent of pocket computer format encoders, it is generally desirable to provide economic circuitry for the random code generation.

SUMMARY OF THE INVENTION

It is therefore an object of this invention to provide a means of producing a code data item automatically without the use of expensive circuitry.

To this end in apparatus for data encryption including a keyboard, an encipher stage for processing data which includes a cipher generator that produces a cipher pulse sequence dependent on a code item supplied thereto in the form of a set of code characters, and a random generator coupled to the cipher generator for generating the code item, the present invention proposes that the random code generator comprises means for generating code characters, for example as a repeated sequence of characters such as represented by the states of a continually running cyclically operating modulo-n counter; and a store for holding the set of code characters constituting the code item. The keyboard has an output, such as a strobe output, connected to the random code generator to control it and cause a code character to be entered in the store on each of successive actuations of at least a group of the keys of the keyboard. Where, for example, a repeated sequence of characters is generated the character present at the instant of key actuation is entered in the store. The store is conveniently a first-in first-out (FIFO) memory device, the keyboard actuation controlling a read-in input of the device. The set of code characters is read out of the store for use as the code data item, or the said one code data item in the specific encipher-decipher apparatus discussed above, at the start of processing under the control of a function sequence control means. The data processed may conveniently come from a text store rather than directly from the input keyboard.

There will be described hereinafter an embodiment of the invention as applied to a data encryption-decryption apparatus.

BRIEF DESCRIPTION OF THE DRAWINGS

Apparatus for data encryption-decryption in accord with the invention is illustrated in the accompanying drawing, the single FIGURE of which shows the circuit of the apparatus in block diagram form.

In the drawing, the apparatus shown comprises a keyboard 1, a processing and control stage 2, an output facility 3, e.g. in the form of an alpha-numerical visual display, and a random character generator comprising a modulo-n-counter 4 and a FIFO (first-in, first-out) memory capable of storing a number of characters and so organised that the write-in and read-out of data can proceed independently of one another but the data is read-out in the same sequence as it is written in. The units 1–5 are interconnected by data and control lines (not shown).

Except for the store 5 and counter 4, the device shown is similar to known encipher-decipher devices such as the models TC-803, GC-805 and GC-905 previously referred to or the devices disclosed in the above-mentioned Swiss patent specifications Nos. 952,937 and 594,261. The processing and control stage 2 takes the form of a microcomputer system and comprises, inter alia, a cipher generator 21 which can be set by a number of code characters to a predetermined initial state and then independently produces a substantially random cipher pulse sequence for encryption or decryption of data directly from the keyboard or from some other source such as a text store. The initial state of the cipher generator is controlled by two code data items, one within the cipher generator 21 and the other derived with the aid of the random character generator, as will be explained. Of course, the cipher generator could be in software form.

The practical implementation of the invention makes use of the fact that in virtually all uses of the encipher-decipher apparatus some keys of the keyboard must be operated before the actual encipher or decipher operation. This is particularly true of apparatus which includes a text store into which either the complete text to be processed or at least a large part thereof is input to be subsequently processed as a whole by the encipher-decipher stage. The present invention exploits these various input keyboard operations that are performed in any event to produce and/or store the discrete characters of the random code item, so that no separate key operations are necessary for this purpose. How this is done in the illustrated embodiment will now be described more fully.

Reverting to the drawing, the modulo-n-counter 4 forming the random generator is clocked continuously by a tiing or clock signal supplied via line 41, for example at 100 kHz. The random character generator 4 is coupled to the FIFO data input. The read-in of the code data into the FIFO store 5 is controlled by a STROBE signal from the keyboard 1. Thus the counter 4 is continually cycling to produce a repeated sequence of characters, i.e. the states of the counter; and the moment of entering the instantaneous state into the FIFO store 5 is determined by the actuation of a keyboard key or at least a key from a certain group of the keys. Each actuation of a key of the keyboard 1 produces a STROBE pulse which is supplied as a read-in signal to the FIFO store 5 the effect of which is that the instantaneous state of the counter 4 is read into store 5. The total number of possible counter states represents the possible code characters. The number of code characters can be controlled by an appropriate choice of the cycle length n of the counter. More particularly, if the code characters are limited to letters of the alphabet, n can be limited to, e.g. 26.

Consequently, each keying operation produces a code character which is read into the FIFO store 5 which can comprise, for example, ten storage stages. If the keyboard is operated more than ten times before the code characters are called out of the store, the last ten characters read-in are present in the store.

Once the text to be enciphered or deciphered has been read into the text store (not shown), processing of the text begins. To this end, the processing stage 2 first supplies a read-out signal to the FIFO store 5, reads out the code characters and transfers them to the encoding generator 21. These characters determine the initial state of the cipher generator in producing the cipher sequence mentioned above. The input text is then processed in known manner, for instance, as disclosed in the patent specifications hereinbefore referred to.

If the code characters produced by the counter 4 are to have a sufficiently random character, the counter 4 must cycle fast enough. The lowest permissible limit for the counter timing is for the counter to pass through at least one complete counting cycle in the shortest possible period of time between two consecutive operations of the keyboard. As a rule, this period of time is determined by keyboard construction and is in the region of 50 milliseconds. In practice, the timing frequency is much higher to enable the counter to cycle at least approximately from 10 to 100 times between two keyboard operations, which experience shows are normally spaced apart by approximately 300 milliseconds. Practical timing frequencies are approximately from 1 kHz upwards, preferably more than 50 kHz and up to about 500 kHz and more particularly of the order of 100 kHz.

Of course, many other cyclic code generators could be used instead of the modulo-n-counter 4. Similar considerations apply to the FIFO store 5. However, the specific elements 4 and 5 disclosed herein have proved very convenient.

What is claimed is:

1. Apparatus for data encryption comprising an input keyboard, an encipher-decipher stage for processing data which includes a cipher generator that produces a cipher pulse sequence dependent on a code item supplied thereto in the form of a set of code characters, and a random code generator coupled to said cipher generator for generating said code item, the improvement wherein:
    said random code generator comprises means for generating code characters and a store coupled thereto for holding a set of code characters; and
    said keyboard having an output coupled to the random code generator to control same and cause a random code character to be entered in the store on each actuation of any random key in at least a group of the keys of the keyboard.

2. Apparatus for data encryption as claimed in claim 1 in which said code character generating means comprises a continually cycling modulo-n counter coupled to said store, and said keyboard control causing the instantaneous state of the counter to be entered into the store at each of said key actuations.

3. Apparatus for data encryption as claimed in claim 1 comprising function control means for reading the set of random code characters out of said store to said cipher generator.

4. Apparatus for data encryption as claimed in claim 2 comprising function control means for reading the set of random code characters out of said store to said cipher generator.

5. Apparatus for data encryption as claimed in claim 3 in which said code character generating means is continually operative to produce a repeated sequence of code characters and said keyboard output is operable to control the moment of entry of a code character into said store at each of said keyboard actuations.

6. Apparatus for data encryption as claimed in claim 5 in which the period for generating one code character sequence is much less than the shortest possible time between two consecutive operations of the keyboard.

7. Apparatus for data encryption as claimed in claim 2 in which said counter is clocked at frequency in the range of 1 to 500 kHz.

8. Apparatus as claimed in claim 2 in which the counter performs not less than one complete cycle in the shortest possible time between two consecutive operations of the keyboard.

9. Apparatus for data encryption as claimed in claim 8 in which in said shortest possible time, the counter performs a plurality of cycles in the range of 10 to 100 cycles.

10. Apparatus for data encryption as claimed in claim 2 in which said store comprises a FIFO store.

11. Apparatus for data encryption-decryption comprising an input keyboard, an encipher-decipher stage for processing data, including a cipher generator operable to produce a cipher pulse sequence dependent on its initial state at the start of data processing data, said initial state being determined by two code data items, a random code generator for producing one of said code data items, and means for controlling the sequence of functions within the apparatus, wherein:
    said random code generator comprising means for generating code characters and a store coupled thereto for holding a set of such code characters to constitute said one code data item, and said random code generator being coupled to said keyboard to be controlled by the actuation of any random key of at least a group of keys of the keyboard such that the selection of successive code characters for entry in the store is timed by successive key actuations.

12. Apparatus for data encryption-decryption as claimed in claim 11 in which said code character generating means is operable to generate a repeated sequence of code characters and each of said key actuations causes the instantaneous code character to be entered into said store.

13. Apparatus for data encryption-decryption as claimed in claim 12 in which the time of one sequence of code characters is much less than the minimum time between two consecutive operations of the keyboard.

14. Apparatus for data encryption-decryption as claimed in claim 12 in which said store comprises a FIFO store having an input for receiving a signal to cause the read-in of a code character to the store, said FIFO input being coupled to said keyboard to receive a read-in signal in response to each of said key actuations, and said FIFO store having an input for receiving a signal from said functions sequence control means to read-out the set of code characters in said FIFO store.

* * * * *